Oct. 5, 1943.  E. W. N. BOOSEY  2,330,947
VACUUM BREAKING FAUCET
Filed Sept. 12, 1941

INVENTOR.
EDWARD W. N. BOOSEY.
BY
ATTORNEY.

Patented Oct. 5, 1943

2,330,947

UNITED STATES PATENT OFFICE 2,330,947

VACUUM BREAKING FAUCET

Edward W. N. Boosey, Detroit, Mich.

Application September 12, 1941, Serial No. 410,611

3 Claims. (Cl. 251—125)

This invention relates to vacuum breaking faucets for use in water of other systems supplying liquid under pressure and the purpose of the invention is to provide a new and unique valve structure for closing the discharge opening of the faucet by pressure in the supply system and to automatically open in the event a vacuum occurs in the system, the faucet being provided with an operating handle to unseat the valve against the pressure in the supply conduit when it is desired to draw liquid therefrom and to prevent the valve from reseating during such withdrawal of liquid.

These and other objects and features of the invention are hereinafter more fully described and claimed and the preferred structural form of the invention is shown in the accompanying drawing in which—

Figure 1:
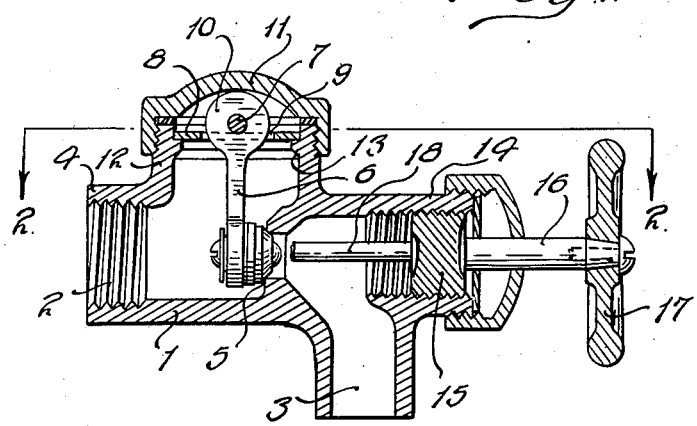
Fig. 1 is a longitudinal section through the device.
Figure 2:
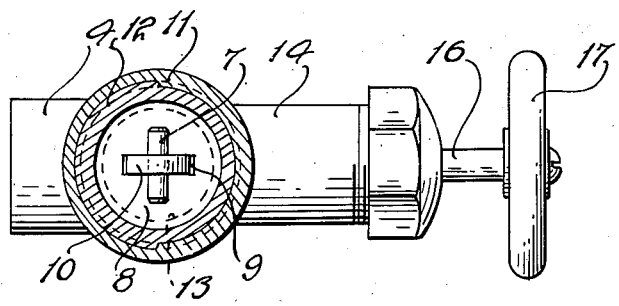
Fig. 2 is a section taken on line 2—2 of Fig. 1.

In its preferred form the body of the valve is indicated at 1 and has a threaded conduit like portion 2 for securing to a liquid supply conduit and a discharge nozzle 3. There is a wall having an opening that may communicate with the inlet end 2 of the faucet and the opening in the wall provides a seat for the valve 5 which is carried on an arm 6. The upper end of the arm is provided with a pin 7 which extends to opposite sides of the arm and rests on a plate 8 having a slot 9 through which the end of the arm extends. The portion 10 of the arm is less in width than the length of the slot 9 thereby permitting the end of the arm to move both laterally and rotatably on the plate 8. The pin 7 therefore is rotatably and slidably supported by the plate on the opposite sides of the slot. The valve and its arm including the end portion 10 and pin 7 may slide on the plate whereby the valve may adjust itself to the seat therefor.

A cap 11 is threaded on the upper end of the tubular portion 12 which is provided with a peripheral shoulder 13 to support the plate 8. The upper end of the cap, in the structure here shown, is crowned and is out of contact with the end 10 of the valve arm. Thus the valve is unrestrained by any part of the mechanism in its movement on the axis of the pivot pin 7.

The valve body has a tubular portion 14 preferably in axial alignment with the tubular portion 4 connected with the liquid supply conduit and is threaded to receive a threaded portion 15 on the faucet operating stem 16 which is here shown as provided with a hand wheel 17 for rotation of the stem and body to effect longitudinal movement of the body 15 in the neck portion 14. The body 15 has an inwardly projecting pin like portion 18 on the axis of rotation of the member 15 and, by rotation of the hand wheel 17 or other convenient device, the pin portion 18 may move the valve in a direction to open the supply conduit connected with the portion 2 of the valve body to the outlet 3.

Upon rotation of the hand wheel in the opposite direction the body 15 and pin 18 are withdrawn from operative relationship with the valve 5 permitting the same to close by pressure in the supply conduit to which the faucet is connected. In the position of parts as shown in full lines in the drawing, which is the normal condition of the faucet, the valve would be automatically opened by reduction of the pressure in the supply conduit below atmospheric pressure and thus prevent a vacuum occurring in the supply system with which the faucet is connected.

In the fresh water supply system for homes and buildings a vacuum sometimes occurs, at least a material reduction in pressure occurs, which results in causing inflow of contaminating fluid into the water system from a contaminating source such as wash tubs or various other water containers in which the water is contaminated. By use of faucets in the supply system functioning as herein described any reduction in pressure of liquid in the conduits of the supply system below atmospheric pressure is automatically prevented or compensated therefor and the faucet is operable to cause discharge of liquid from the faucet in the usual manner. Thus the system is maintained free from a reduced pressure which has heretofore been of considerable trouble particularly in water supply systems.

It is further pointed out that the valve 5 and the supporting plate 6 may be readily removed through the opening normally closed by the cap 11 for repair of the valve parts, the cap being removed at a time when the supply system has been intentionally disconnected from a supply main, as is usually required in repairing the usual faucet and valve.

It is believed evident from the foregoing description that my improved vacuum breaking faucet is of comparatively simple and inexpensive construction and that the various features and objects of the invention are attained by the described structural relationship of parts.

Having thus briefly described my invention, its utility and mode of operation, what I claim and desire to secure by Letters Patent of the United States is:

1. A vacuum breaking faucet for preventing reduction in pressure in a water supply conduit below atmospheric pressure, comprising a body adapted for connection with the water supply conduit and having a discharge nozzle, an apertured wall between the said connection with the supply conduit and the nozzle, said body having an upwardly extending open-ended tubular portion opening to the body on the inlet side of said apertured wall, a valve for closing the aperture in the said wall and having an arm, means pivotally and slidably supporting the arm in the said tubular extension, said last named means comprising a plate fitting the said open ended tubular portion and having a slot and said arm having an end portion insertable through the slot of the plate of a width in a direction parallel with the plate less than the length of the aperture in the plate to permit the valve to align itself with the seat under pressure of fluid within the valve body a cap for closing the extension to atmosphere, said valve being free to swing to open position on reduction in pressure in the supply conduit below atmospheric pressure, and manual means for opening the valve against pressure in the supply conduit tending to close the same.

2. A vacuum breaking faucet for preventing reduction in pressure in a water supply conduit below atmospheric pressure, comprising a body having a tubular portion adapted for connection with a water supply conduit and having a discharge nozzle, and an apertured wall therebetween said body having an upwardly extending open-ended tubular portion open to the body on the inlet side of the apertured wall, a valve for closing the aperture in the said wall and having an arm extending into the said tubular portion, the said portion having a shoulder, a plate supported on the shoulder and having a slot through which the arm extends, a pin in the end of the arm above the slot and resting on the plate at its opposite ends on opposite sides of the said slot and providing a pendant valve free to swing away from its seat on reduction in pressure in the supply conduit below atmospheric pressure and held in engagement with the seat by pressure in the supply conduit above atmospheric pressure, said body having an internally threaded tubular portion in axial alignment with the portion of the body connected to the supply conduit, a valve operating means comprising a body in threaded relation with the said extension having an operating handle at one end externally of the said extension and at its opposite end having a projecting pin-like stem on the axis of the extension and aperture for the valve whereby on rotation of the handle means in one direction the pin-like extension is moved to engagement with the valve to open the same against the pressure of liquid in the supply conduit to provide for discharge of water from the faucet and rotation of the said handle means in the opposite direction out of contact with the valve permits the valve to swing to closed position by liquid pressure in the supply conduit above atmospheric pressure.

3. A faucet having a body adapted at one end for connection with the water supply conduit of a plumbing system and having an outlet for discharge of water, an apertured wall extending transversely of the body between the inlet and outlet, a valve on the inlet side of said wall, a seat for the valve about the aperture in said wall, said body having an extension on the inlet side of said wall, means pivotally and slidably supporting the valve comprising a slotted plate in the extension, an arm for the valve extending through the slot of less width than the length of the slot, and a pin in said arm end resting on the side of the plate opposite the valve permitting the valve to move toward and to alignment with the said seat by pressure of liquid in the supply conduit above atmospheric pressure and automatically openable by atmospheric pressure on the outlet side of the said wall above the pressure of liquid in the supply conduit, and means for moving the valve against liquid pressure in the supply conduit greater than atmospheric pressure.

EDWARD W. N. BOOSEY.